Feb. 20, 1945. V. J. DENLINGER 2,369,723
POTATO HARVESTER
Filed Oct. 30, 1943 4 Sheets-Sheet 1

Inventor
V. J. Denlinger.
By H. B. Willson & Co. Attorney

Feb. 20, 1945.    V. J. DENLINGER    2,369,723
POTATO HARVESTER
Filed Oct. 30, 1943    4 Sheets-Sheet 2

Inventor
V. J. Denlinger.
By H. B. Wilson & Co. Attorney

Feb. 20, 1945.  V. J. DENLINGER  2,369,723
POTATO HARVESTER
Filed Oct. 30, 1943  4 Sheets-Sheet 3
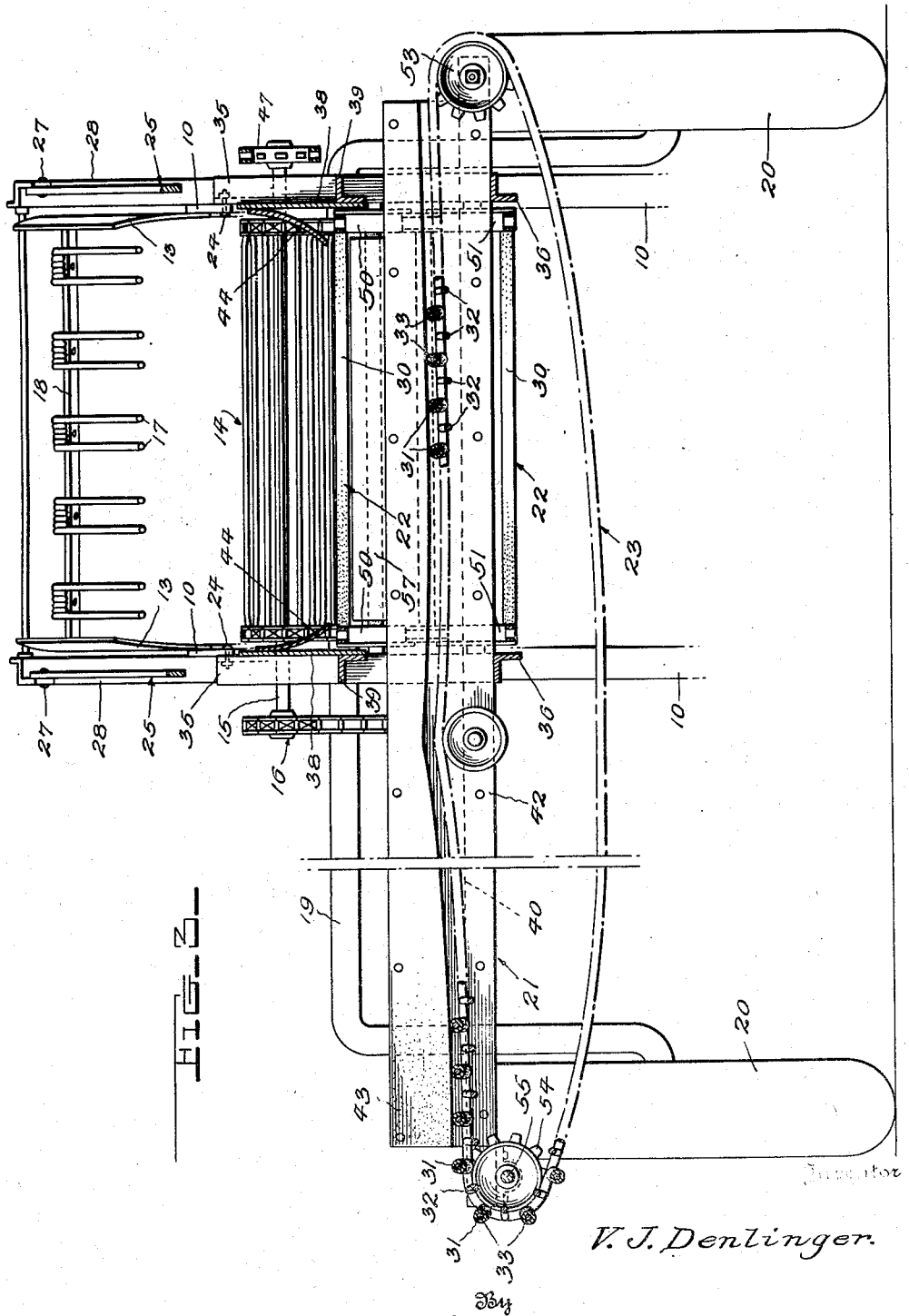
V. J. Denlinger.

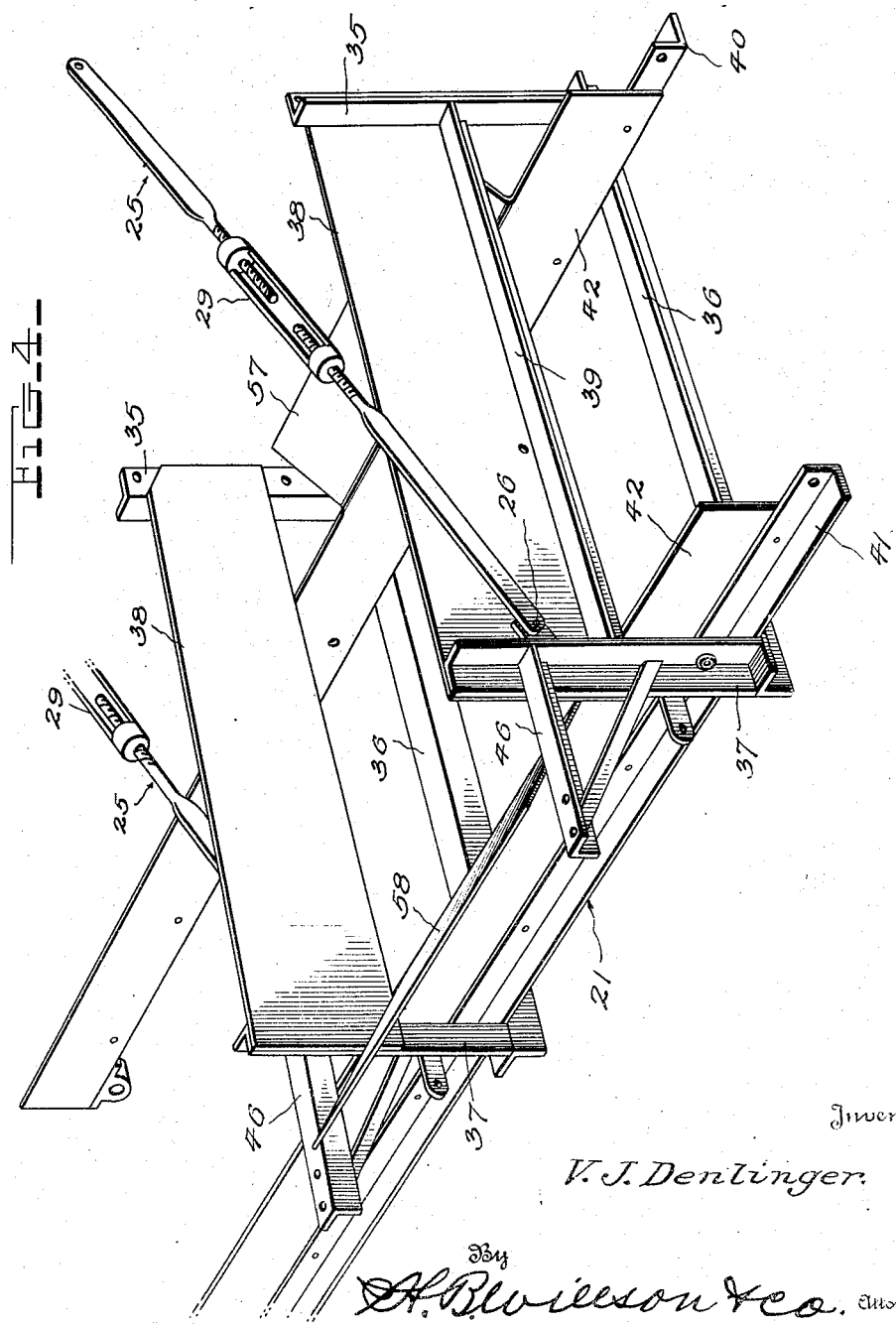

Patented Feb. 20, 1945

2,369,723

UNITED STATES PATENT OFFICE 2,369,723

POTATO HARVESTER

Victor J. Denlinger, Paradise, Pa.

Application October 30, 1943, Serial No. 508,290

2 Claims. (Cl. 55—51)

The invention aims to provide a new and improved machine for digging potatoes, separating the vines and dirt therefrom, and laterally conveying the cleaned potatoes in readiness for sacking or hauling.

The machine includes a longitudinal vine conveyor onto which the dug potatoes and vines are discharged by a conveyor inclined rearwardly from the digging means, said vine conveyor serving to carry the vines rearwardly and drop them on the ground and allowing the potatoes and any dirt to fall through. Under the vine conveyor is a transverse conveyor which separates any remaining dirt from the potatoes and either conveys the cleaned potatoes to a loading elevator or a sacker elevator, or discharges them in a windrow onto the ground; and a further object is to provide a novel frame structure for mounting said vine conveyor and said transverse conveyor.

The vine conveyor is preferably inclined rearwardly and it assists in separating the potatoes from the vines. I have found that the best results are attainable when the inclination of this conveyor can be varied according to the character of the soil and its degree of dampness, hardness, etc.; and another object is to make novel provision for tilting the above mentioned frame structure to attain this end.

Yet another aim is to provide a rather simple and inexpensive machine, yet one which will be rapid, efficient and long-lived.

With the foregoing in view, the invention resides in the novel subject matter hereinafter described and claimed, the description being accomplished by reference to the accompanying drawings.

Figure 3 is a transverse sectional view on line 3—3 of Figs. 1 and 2.

Figure 4 is a perspective view showing the frame structure upon which the vine conveyor and the transverse conveyor are mounted.

Figure 5 is a fragmentary perspective view showing the preferred construction for the transverse conveyor.

Figure 1:
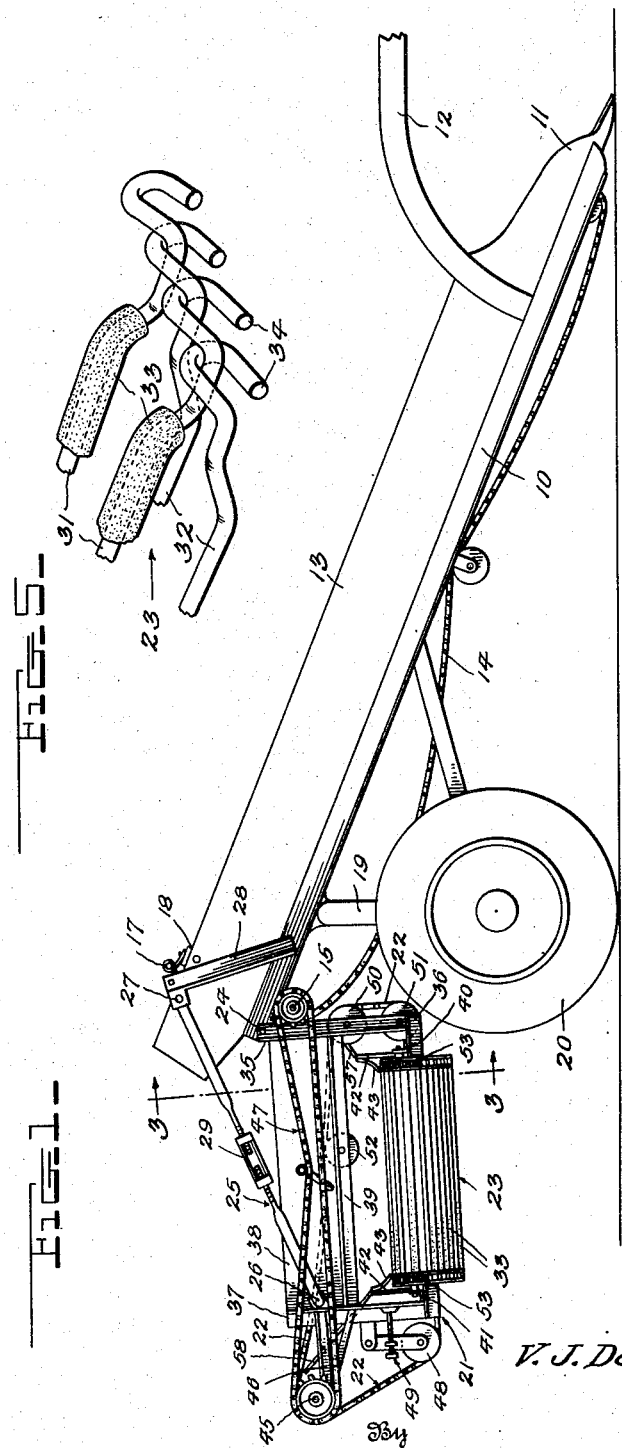
Figure 1 is a side elevation.

A construction is illustrated which has proven to be of advantage and while this construction will be specifically described, it is to be understood that variations may be made within the scope of the invention as claimed.

A rearwardly inclined frame 10 is provided with customary digging means 11 and with a beam 12 at its front end, said frame having longitudinal side boards or plates 13 between which the upper reach of an endless conveyor 14 is operable in the usual manner to elevate the dug potatoes and vines and to shake most of the dirt loose. The shaft 15 at the upper end of the frame 10 for driving the conveyor 14 may be driven in any appropriate manner, a portion of a chain drive 16 being illustrated. Above this shaft and the conveyor 14, I preferably employ a plurality of suitably mounted spring fingers 17 which tend to retard the rearward movement of the vines for better separation of the potatoes therefrom. A transverse bar 18 is shown carrying the fingers 17 and suitably secured to the side boards or plates 13.

An arched axle 19 is shown supporting the rear end of the frame 10, said axle having appropriate wheels 20 which are preferably pneumatically tired.

A second frame 21 is provided behind and for the most part below the upper end of the frame 10, and upon this frame 21 I mount the vine conveyor 22 and the transverse potato conveyor 23. Both of these conveyors are of openwork form and both of them are preferably of the endless web or belt type. The conveyor 22 carries the vines rearwardly and discharges them onto the ground and also aids in further separating the vines from the potatoes and dirt, and I have found that the best results are attainable when the upper reach of said conveyor 22 is rearwardly inclined. Moreover, this inclination should be varied according to the character of the soil from which the potatoes are being dug, and the degree of dampness, hardness, etc., of said soil. In order to permit the inclination of the upper reach of this conveyor 22 to be varied, I pivotally connect the front end of the frame 21 with the rear end of the frame 10 as shown at 24, upon a transverse axis, and I also connect the two frames by adjusting means which is operable to raise or lower the rear end of the frame 21, thus permitting the inclination of the upper reach of the conveyor 22 to be varied as required. In the present disclosure, suitable longitudinally adjustable suspenders 25 are connected at their rear ends with the rear portion of the frame 21, as indicated at 26 and are connected at their front ends at 27 with rigid posts 28 which are secured to and rise from the frame 10. When the suspenders 25 are of the type disclosed, they include turn-buckles 29, adjustment of which serves to tilt the frame 21 as desired.

Most of the potatoes falling through the upper reach of the vine conveyor 22, fall upon the front portion of the transverse conveyor 23 and in order that they may be more evenly distributed over the upper reach of this conveyor, said reach preferably declines rearwardly as shown in Fig. 1. With the potatoes thus distributed upon its upper reach, the conveyor 23 may more effectively separate any remaining dirt from the potatoes before they are discharged.

Figure 2:
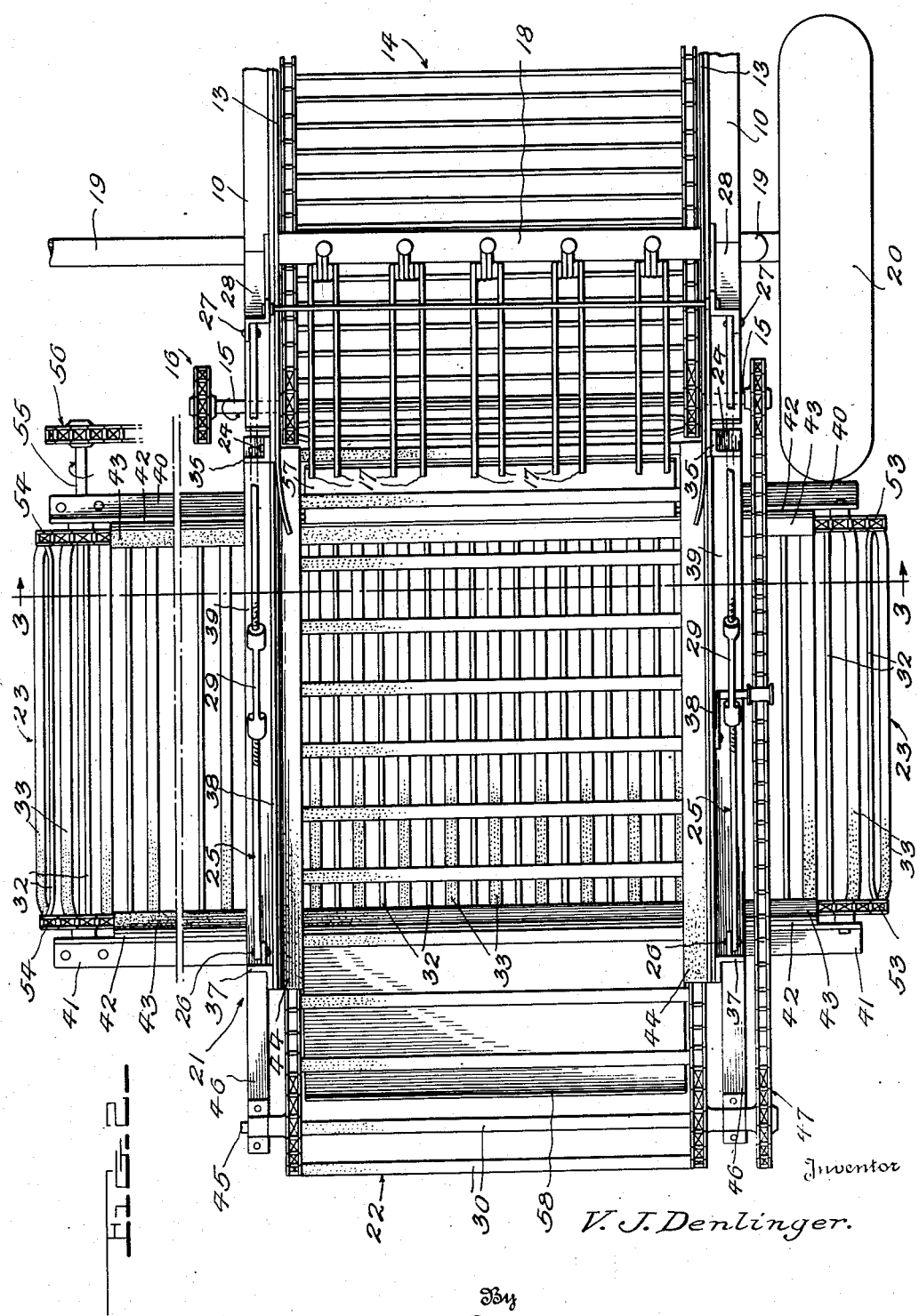
Figure 2 is an enlarged top plan view with the front portion of the machine omitted.

The conveyors 22 and 23 are of the rod type in the present disclosure, the rods of the conveyor 22 being rather widely spaced as seen in Fig. 2, while the rods of the conveyor 23 are preferably spaced about the same as those of the conveyor 14 which inclines rearwardly from the digger 11. All of the rods of the vine conveyor 22 are preferably provided with tubular yieldable cushioning coverings 30 to prevent them from bruising the potatoes dropped onto them. As is customary with most conveyors used for a purpose similar to that of the conveyor 14, the rods of the conveyor 23 are preferably related as illustrated in Fig. 5, with the alternate rods 31 higher than the intervening rods 32, except at their ends. Upon the high rods 31 I provide yieldable tubular cushioning coverings 33 preferably formed of rubber to prevent bruising of the potatoes, most of which do not touch the low rods 32. It is preferable that the ends of the rods 31 and 32 be formed with interengaging hooks 34 as seen in Fig. 5, to provide in effect side chains, but no attempt is made in the other views to show this structural detail which is in itself old.

The frame 21 is preferably constructed as shown most clearly in Fig. 4. This frame includes two front posts 35, the upper ends of which are pivoted at 24 to the frame 10. Two longitudinal bars 36 are secured to the lower ends of these posts and extend rearwardly therefrom, and two rear posts 37 are secured to and project upwardly from the rear ends of said bars 36. The upper portions of the front and rear posts 35 and 37 are tied together by parallel longitudinal plates 38 which hold the vines and potatoes against falling laterally from the conveyor 22 whose upper reach extends between said plates. At the lower edges of these plates, the front and rear posts are preferably tied together by longitudinal bars 39.

A front transverse bar 40 is secured upon the front portions of the longitudinal bars 36, at the inner sides of the posts 35, and a rear transverse bar 41 is secured upon the rear portions of said bars 36 at the front sides of the posts 37. Parallel transverse plates 42 are secured to the bars 40 and 41 to hold the potatoes upon the upper reach of the transverse conveyor 23. To protect the potatoes against the side chains of this conveyor, flexible guard strips 43 are preferably secured to the plates 42. For the same purpose, other flexible guard strips 44 are secured to the plates 38, said strips 44, however, of course extending over the vine conveyor 22.

The upper rear portion of the conveyor 22 is trained around suitable sprockets on a transverse shaft 45 which is suitably mounted on brackets 46 projecting rearwardly from the posts 37, said shaft 45 being driven by a chain drive 47 from the shaft 15. The lower rear portion of the conveyor 22 is trained around guide wheels 48 carried by suitable tighteners 49 mounted on the posts 37, and the front portion of said conveyor is trained around upper and lower guide wheels 50 and 51 mounted on the front posts 35. Suitable idlers such as 52 (Fig. 1) may be carried by the bars 39 to aid in properly supporting the upper reach of the conveyor 22, and the lower reach of this conveyor extends under the transverse bars 40 and 41, between the upper and lower reaches of the potato conveyor 23.

One end of the conveyor 23 is trained around sprockets 53 mounted on one end of the transverse bars 40 and 41, and the other ends of said conveyor is engaged with sprockets 54 on a shaft 55 mounted on the other ends of said bars 40 and 41. Shaft 55 may be driven in any suitable way, a portion of a chain drive 56 being shown.

To guide the potatoes dropping through the upper reach of the conveyor 22, onto the conveyor 23, suitable guide plates 57 and 58 have been shown inclining from the plates 42 above described.

It is preferable that the frame 10 and its conveyor 14 be about 50% longer than the corresponding elements of a conventional potato digger, these elements in the machine which I have constructed, being about nine feet long instead of six. By so doing, much better separation of the potatoes from the vines and dirt, is attained. The potatoes and vines are dropped onto the upper reach of the vine conveyor 22, the potatoes falling through onto the conveyor 23 and the vines being carried off and discharged onto the ground. Of course, a further separation of vines, potatoes and dirt occurs during handling by this conveyor 22, and any remaining dirt is separated from the potatoes by means of the conveyor 23. In the present showing, this conveyor discharges the potatoes in a windrow upon the ground, but it obviously could discharge into an elevator to elevate the potatoes to a wagon or truck bed, or to a sacking means.

From the foregoing taken in connection with the accompanying drawings, it will be seen that novel and advantageous provision has been made for carrying out the objects of the invention, and while preferences have been disclosed, attention is again invited to the possibility of making variations within the scope of the invention as claimed.

I claim:

1. In a potato harvester, a separating means for use at the rear of a potato digger having a rearwardly inclined frame and an endless conveyor thereon for rearwardly conveying dug potatoes and vines, comprising a supporting frame composed of two front posts to extend downwardly from the rear end of the inclined frame of the digger at the sides thereof, two longitudinal bars secured to and projecting rearwardly from the lower ends of said front posts, two rear posts secured to and rising from the rear ends of said longitudinal bars, two parallel longitudinal plates secured to and extending between said front and rear posts, a front transverse bar extending across and secured to the front end portions of said longitudinal bars at the rear sides of said front posts, a rear transverse bar extending across and secured to the rear end portions of said longitudinal bars at the front sides of said rear posts, two additional plates secured to and extending longitudinally of and projecting upwardly from said transverse bars, and two brackets projecting rearwardly from the upper portions of said rear posts, an endless longitudinal vine conveyor having a rearwardly traveling rearwardly inclined upper reach between the first mentioned plates and a lower reach extending under said transverse bars, driving and guiding means for said vine conveyor mounted on said posts and brackets, an endless transverse potato conveyor having an upper reach disposed between said additional plates and a lower reach extending under said longitudinal bars, guiding and driving means for said potato conveyor mounted on said transverse bars, means at the upper ends of said front posts for pivotally connecting said supporting frame to the rear end of the inclined frame of the digger on a transverse axis to allow said supporting frame to tilt, forwardly and upwardly inclined longitudinally-extensible suspenders connected with the rear portion of said supporting frame for tilting the latter as required, and means for connecting the front upper ends of said suspenders with said inclined frame of the digger.

2. In a potato harvester, a separating means, for use at the rear of a potato digger having a rearwardly inclined frame and an endless conveyor thereon for rearwardly conveying dug potatoes and vines, comprising a supporting frame composed of two front posts to extend downwardly from the rear end of the inclined frame of the digger at the sides thereof, two longitudinal bars secured to and projecting rearwardly from the lower ends of said front posts, two rear posts secured to and rising from the rear ends of said longitudinal bars, two parallel longitudinal plates secured to and extending between said front and rear posts, a front transverse bar extending across and secured to the front end portions of said longitudinal bars at the rear sides of said front posts, a rear transverse bar extending across and secured to the rear end portions of said longitudinal bars at the front sides of said rear posts, two additional plates secured to and extending longitudinally of and projecting upwardly from said transverse bars, and two brackets projecting rearwardly from the upper portions of said rear posts, vine-conveying means positioned between said first mentioned plates, driving means for said vine-conveying means mounted on said posts and brackets, an endless transverse potato conveyor having an upper reach disposed between said additional plates and a lower reach extending under said longitudinal bars, guiding and driving means for said potato conveyor mounted on said transverse bars, means at the upper ends of said front posts for pivotally connecting said supporting frame to the rear end of the inclined frame of the digger on a transverse axis to allow said supporting frame to tilt, forwardly and upwardly inclined, longitudinally-extensible suspenders connected with the rear portion of said supporting frame for tilting the latter as required, and means for connecting the front upper ends of said suspenders with said inclined frame of the digger.

VICTOR J. DENLINGER.